(No Model.)
J. O. GROVER.
BEVEL SQUARE.
No. 320,931. Patented June 30, 1885.
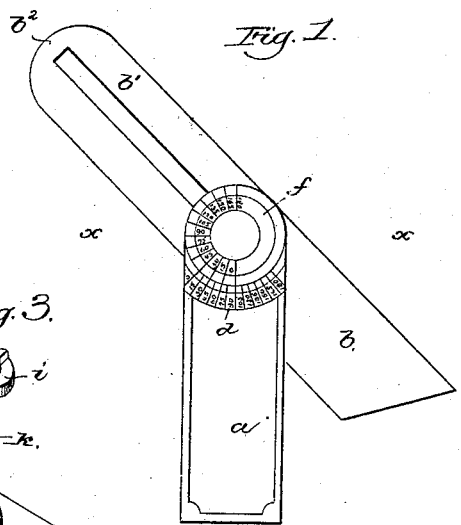
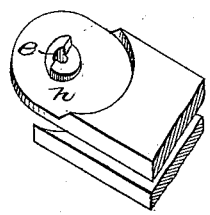
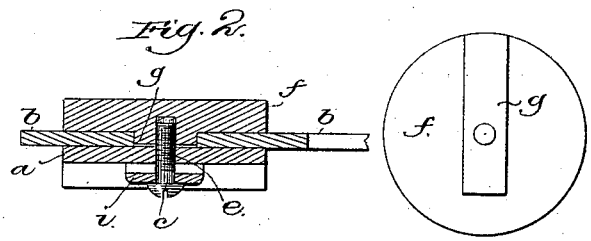
Witnesses.
John F. C. Prinkerk
Henry March
Inventor:
Jonathan O. Grover.
by Crosby & Gregory
attys.

UNITED STATES PATENT OFFICE.

JONATHAN O. GROVER, OF LYNN, MASSACHUSETTS.

BEVEL-SQUARE.

SPECIFICATION forming part of Letters Patent No. 320,931, dated June 30, 1885.

Application filed June 30, 1884. (No model.)

*To all whom it may concern:*

Be it known that I, JONATHAN O. GROVER, of Lynn, county of Essex, State of Massachusetts, have invented an Improvement in Bevel-Squares, of which the following description, in connection with the accompanying drawings, is a specification, like letters on the drawings representing like parts.

My invention has for its object to provide a carpenter's bevel having the usual stock or handle and blade having a longitudinal and pivotal movement in a slot in the said stock with a protracter or graduated arc to indicate the angle between the edge of the blade and stock, so that it may be set at any desired angle.

The blade of my improved bevel has a long slot and is longitudinally and pivotally movable in the end of the stock, like the usual carpenter's bevel, and the bevel at one side of the blade is provided with a movable disk having a tongue entering the slot of the blade, so that the said block accompanies the blade in its pivotal or rotary movement, and the portion of the stock adjacent to the said disk is concaved or curved to fit it, the periphery of the disk and curved portion of the stock being graduated to indicate the angle or amount of rotary movement.

One set of graduations is preferably made of half the true size, or, in other words, a quadrant is divided into one hundred and eighty parts marked from 0' to 180°, so that by setting the 0 point of the block opposite any desired number the blade will be set at an angle to the stock equal to one half the said number of degrees as is requisite for marking the angle to cut a miter for a joint of any desired number of degrees. For instance, if it were desired to mark the miter for ninety degrees, by setting the zero-point of the disk opposite the graduation marked 90 the blade would be set at an angle of forty-five degrees to the stock, which would be the proper angle for the miter of a ninety-degree joint.

Figure 1 is a plan view of a bevel-square embodying my invention; Fig. 2, a transverse section thereof on line *x*; Figs. 3 and 4, details of the clamping device, to be referred to, and Fig. 5 a detail showing the under side of the graduated block or disk.

The handle or stock *a* is slotted in the usual manner to receive the blade *b*, which is slotted and has a longitudinal movement in the slot of the stock and an angular movement about a pivot, *c*, in the end of the stock, as usual. The stock *a* at one side of the blade *b* terminates in a concave graduated arc, *d*, concentric with the pivot *c*, which turns in a suitable socket, *e*, in the portion of the stock at the other side of the blade, and the bevel is provided with a circular block or disk, *f*, which receives the pivot *c*, and is provided with a tongue or projection, *g*, which enters the slot *b'* of the blade *b*, causing the said block or disk and blade to rotate together, although the blade has an independent longitudinal movement.

The tongue *g* does not extend wholly across the block or disk, a sufficient space being left at one end to receive the bridge $b^2$ across the slot *b'* at the end of the blade *b*.

The disk *f* is graduated, and as it accompanies the blade *b* in its pivotal or angular movement the graduations of the disk, in connection with a suitable mark on the stock, will indicate the angular movement of the blade or the angle between the edges of the blade and stock.

In the graduated arc *d* half-degree spaces are numbered as whole degrees, so that the angle between the blade and stock is but one-half the angle indicated on the said arc, or, in other words, bisects the indicated angle, as is required in making miter-joints.

The zero-line of each graduated arc may be used as the gaging point or line from which to read the indications of the other, and when the blade *b* is closed within the stock, or the angle between the blade and stock is nothing, the two zero-lines coincide.

When the operator desires to set the blade *b* at a given angle to the stock, he will turn the said blade until the number on the disk *f* corresponding to the number of degrees of the angle is opposite the zero-line of the arc *d*. For example, as shown in Fig. 1, the blade *b* is set at an angle of forty-five degrees. If, however, the operator has a joint at a given angle and wishes to set the blade at the proper angle for mitering the joint, he can set the zero-line of the disk *f* opposite the number on the arc *d* corresponding to the degrees in the angle of the joint, and the angle between the blade and stock will be one-half the angle of the joint, or just what is required for making the miter. Thus in Fig. 1 the blade making an angle of forty-five degrees with the stock is set with the zero-mark of disk $f$ opposite 90 on the arc $d$, and is in proper position to mark the miter for a joint of ninety degrees.

The outer face of the stock around the pivot-socket $e$ is provided with spirally-inclined cam-projections $h$, (best shown in Fig. 3,) which co-operate with corresponding cam-surfaces on the clamping device $i$, which has a rotary movement on the shank of the pivot $c$, and is confined between the head of the said pivot and the cam-projections $h$. The clamping device $i$ has a finger-piece, $k$, by which it is rotated, tending to wedge the portion of the stock $a$ around the pivot down upon the blade $b$ and disk $f$, thus tightly clamping the said disk and blade with relation to the stock after the said blade has been turned to the desired angle, securely locking the said blade until it is desired to set it at another angle.

It will be seen that the blade has the same movements with relation to the stock as in the usual bevels, and at the same time has a graduated device for indicating its angular movement without in any way interfering with its longitudinal movement.

The stock being thicker than the blade or projecting at either side thereof enables the bevel to be applied with the stock along the edge of a board and the blade on the face of the board with either side of the bevel uppermost, as may be desired.

I claim—

The combination of the slotted blade $b$, graduated disk $f$, having the tongue $g$ extending partially across the under face thereof to fit and slide in the slotted blade, the stock $a$, slitted and concaved at its end to fit the blade and disk, the concaved edge having graduations, as shown, the pivot-socket $e$, having the spirally-inclined cam-projection $h$, the handled clamping-piece $i$, having cam-faces to fit the said cam-projection $h$, and the fastening-screw $c$, all as shown and described.

In testimony whereof I have signed my name to this specification in the presence of two subscribing witnesses.

JONATHAN O. GROVER.

Witnesses:
G. W. GREGORY,
JOS. P. LIVERMORE.